W. YOUNG.
STEADYING DEVICE FOR SUPPLEMENTARY VEHICLE SPRINGS.
APPLICATION FILED DEC. 26, 1906.
901,578.
Patented Oct. 20, 1908.
5 SHEETS—SHEET 1.
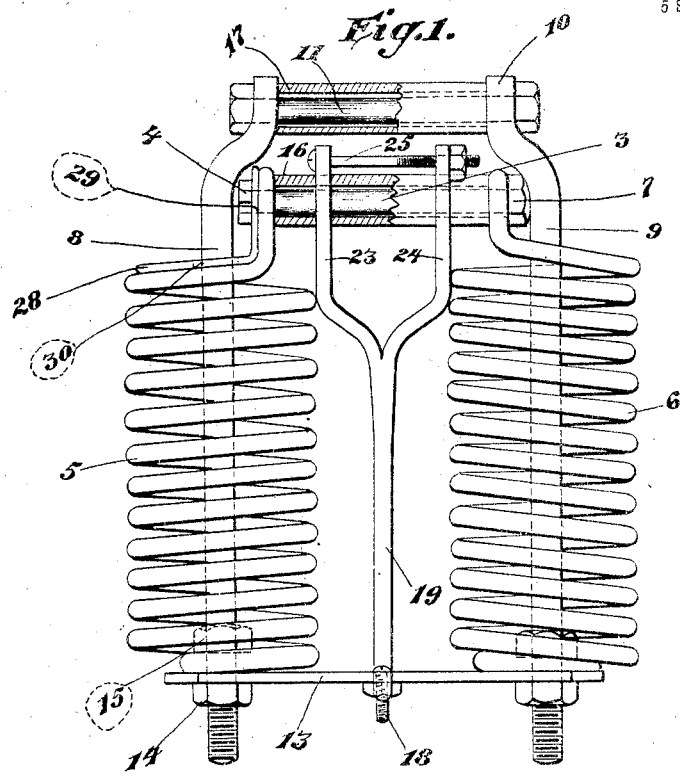
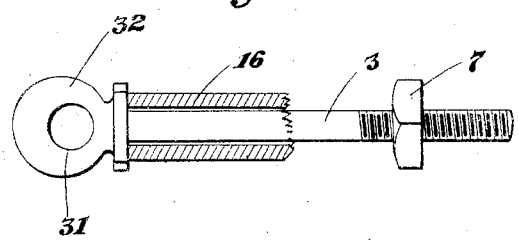
Witnesses:
Chas. R. Becker.
Elliott R. Goldsmith
Inventor:
William Young,
By Hugh K. Wagner,
His Attorney.

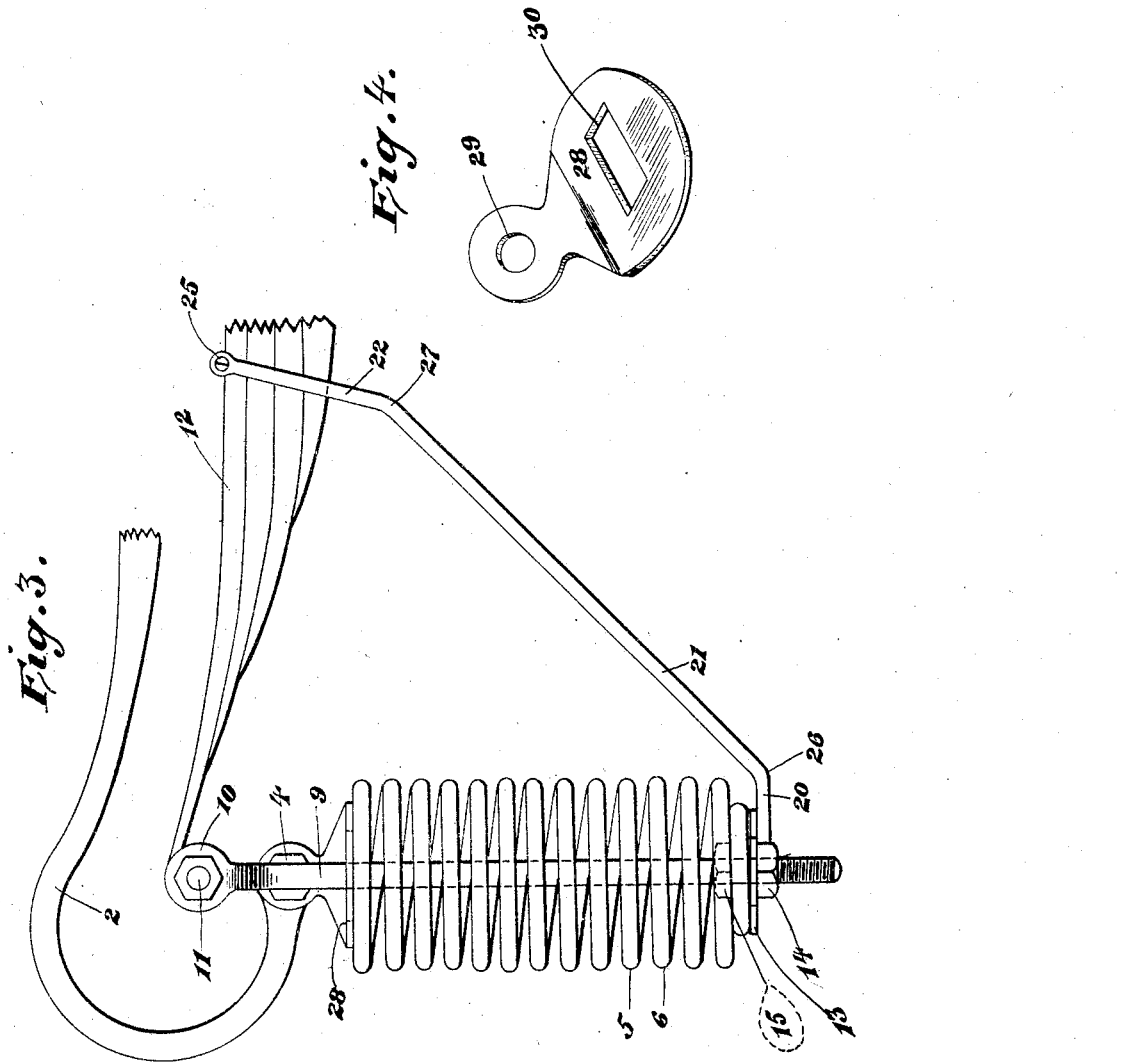

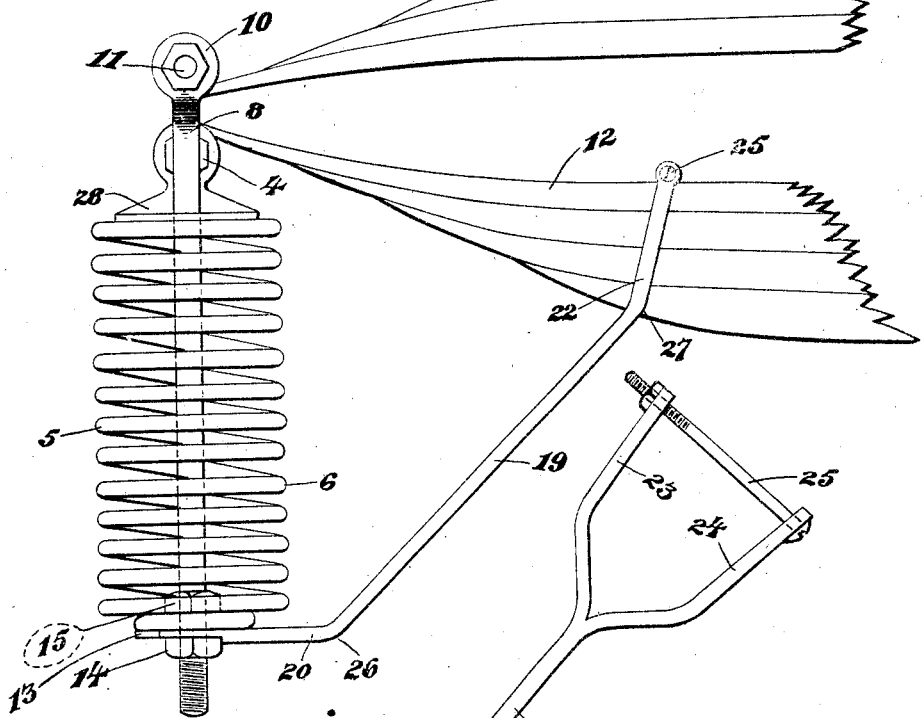

W. YOUNG.
STEADYING DEVICE FOR SUPPLEMENTARY VEHICLE SPRINGS.
APPLICATION FILED DEC. 26, 1906.
901,578.
Patented Oct. 20, 1908.
5 SHEETS—SHEET 4.
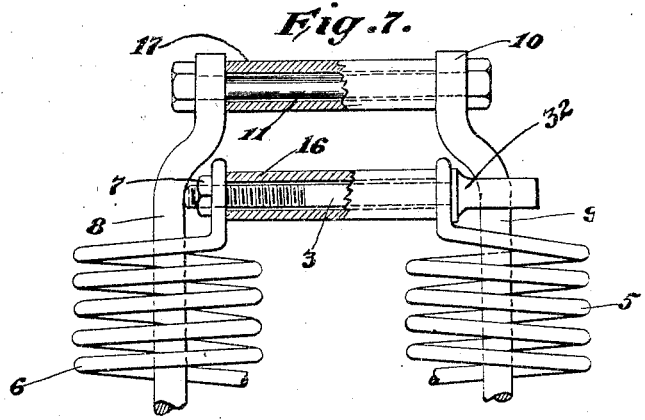
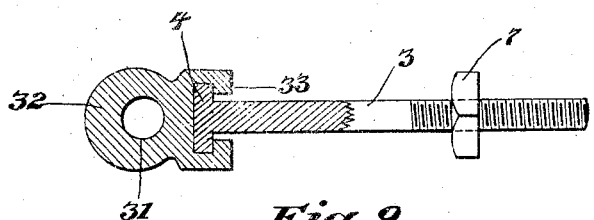
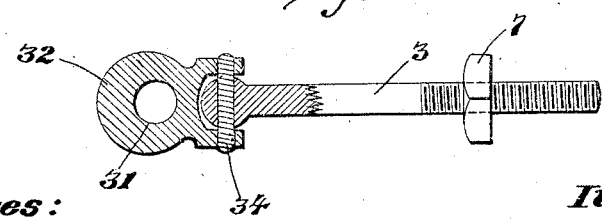
Witnesses:
Chas A Becker,
Elliott R Goldsmith
Inventor:
William Young,
By Hugh K. Wagner,
His Attorney.

W. YOUNG.
STEADYING DEVICE FOR SUPPLEMENTARY VEHICLE SPRINGS.
APPLICATION FILED DEC. 26, 1906.
901,578.
Patented Oct. 20, 1908.
5 SHEETS—SHEET 5.
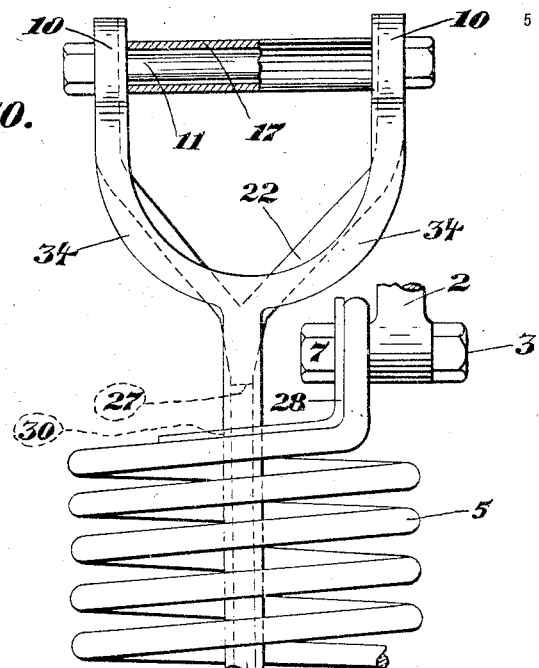
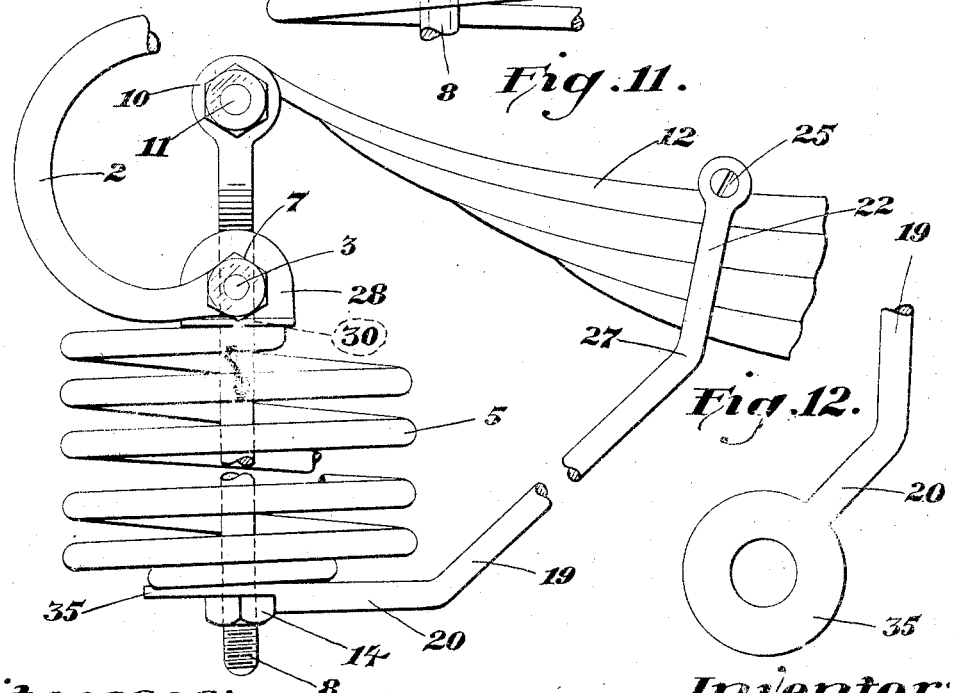
Witnesses:
Chas. J. Becker
Elliott R. Goldsmith
Inventor:
William Young,
By Hugh K. Wagner
His Attorney.

UNITED STATES PATENT OFFICE.

WILLIAM YOUNG, OF ST. LOUIS, MISSOURI, ASSIGNOR TO SUPPLEMENTARY SPIRAL SPRING COMPANY, OF ST. LOUIS, MISSOURI, A CORPORATION OF MISSOURI.

STEADYING DEVICE FOR SUPPLEMENTARY VEHICLE-SPRINGS.

No. 901,578.     Specification of Letters Patent.     Patented Oct. 20, 1908.

Application filed December 26, 1906. Serial No. 349,380.

*To all whom it may concern:*

Be it known that I, WILLIAM YOUNG, a citizen of the United States, residing in the city of St. Louis and State of Missouri, have invented certain new and useful Improvements in Steadying Devices for Supplementary Vehicle-Springs, of which the following is a specification, reference being had therein to the accompanying drawings.

This invention relates to steadying devices for supplementary vehicle springs, and is particularly intended for use in connection with springs of the kind described in the patent granted to Samuel Furmidge, dated December 19, 1905, No. 807,612.

The present invention is designed especially to overcome those forces which have a tendency to distort the shape of the supplementary springs and thus to destroy or impair their efficacy. While, however, in this application reference is made to only one particular type of supplementary springs, it should be understood that said type is given merely as an example, and that there may be many such springs in connection with which the hereindescribed invention can advantageously be used.

In the drawings forming part of this specification, in which like numbers of reference denote like parts wherever they occur, Figure 1 is a front elevation of a spring equipped with my device, part of the spring being shown in section; Fig. 2 is a top plan view of a modified form of one part of the steadying device; Fig. 3 is a side elevation of a spring equipped with my device, showing the method of attaching a spring equipped with my steadying device to a semi-elliptic vehicle spring; Fig. 4 is a perspective detailed view of one part of the steadying device here described; Fig. 5 is a view similar to Fig. 3, the supplementary spring being used, however, in conjunction with a full elliptic spring; Fig. 6 is a perspective view of a modified form of one part of the steadying device; Fig. 7 is a fragmentary view, in elevation, of a spring equipped with the modification depicted in Fig. 2; Fig. 8 is a view similar to Fig. 2, showing another modification of the same member; Fig. 9 is a view of another form of the device shown in Fig. 8; Figs. 10 and 11 are front and side elevations, respectively, of a single helical spring equipped with the steadying device; and Fig. 12 is a view showing one end of the steadying device as modified for use in connection with a single helical spring.

From the vehicle body (not shown) depends the bracket 2, which bracket encircles the cross-bolt 3, being in pivotal connection therewith. Said cross-bolt has the usual head or shoulder 4 at one end, the opposite end being threaded to receive the nut 7. Helical springs 5 and 6, having eyes turned on their upper ends, through which eyes bolt 3 passes, are connected as rigidly as possible at the ends opposite said eyes to the vertical bolts 8 and 9. Said bolts have eyes 10 turned thereon at the ends opposite the point of connection with springs 5 and 6, and, by means of said eyes 10, are connected to cross-bolt 11. A cross-tie 13, having perforations therein through which the lower ends of the bolts 8 and 9 pass, binds said bolts together. Nuts 14 and 15, screwed upon the lower ends of bolts 8 and 9, keep helical springs 5 and 6 in rigid connection with said bolts, and, likewise, with the cross-tie 13. The construction, arrangement, and function of all of the afore-mentioned parts are more particularly described in said Furmidge Patent No. 807,612. In the improved construction described in this application, however, instead of having the hangers 2 or leaf springs 12 secured directly to the cross-bolts 3 and 11, as in said Furmidge patent, sleeves 16 and 17 are placed upon said bolts, and it is with these sleeves that the leaf springs and hangers are in engagement.

In Fig. 5 a modified construction is shown, in which the supplementary springs, together with the invention forming the subject-matter of the present application, are used in conjunction with a full elliptic spring, the top leaves of which are connected to the cross-bolt 11 and the bottom leaves to the cross-bolt 3, but the essential features of the invention remain unchanged. Many other forms of semi-elliptic or full elliptic springs will readily occur to the minds of those skilled in the art as affording suitable opportunity for the use of supplementary springs equipped with the steadying devices herein described. Moreover, while the description has particular reference to a pair of helical springs, a single helical spring may be used in place of the pair of springs, this modification being hereinafter more fully described.

One end of brace 19 is secured to leaf spring 12, while its opposite end is bound to cross-tie 13 by means of bolt 18, or other suitable fastening, or, if desired, said brace may be formed integral with said cross-tie, as shown in Fig. 6. Said brace comprises, preferably, a horizontal part 20, an obliquely-extending part 21, and a vertical part 22, said vertical part being bifurcated and having the two arms 23 and 24. Through the yoke formed by the arms 23 and 24 the leaf spring 12 is inserted, and a bolt 25, passing through eyes formed on the ends of arms 23 and 24, serves to clamp said arms tightly against spring 12, thereby securing brace 19 to said spring 12, and holding it fixed in any desired position thereupon. While said brace might be a single straight member, it is preferably of the shape herein indicated, for, when thus constructed, the brace can be bent slightly at the angles 26 and 27, if necessary, and can, accordingly, be fitted in place more easily than could a straight and unyielding member. In addition, a brace so bent admits of a slight degree of resilience, while a straight rod would have none whatever. Inasmuch as said brace is secured at one end to the leaf spring 12 and at the other end to bolts 8 and 9, the lower ends of said bolts 8 and 9, to which it is secured, are kept constantly at a fixed distance from the leaf spring, and are not permitted to have any back-and-forth movement with relation to the leaf spring. Since, moreover, the end of said leaf spring is, by means of cross-bolt 11, in pivotal connection with the upper ends of said vertical bolts, it is obvious that bolts 8 and 9 can be fixed and maintained at any desired angle with reference to the leaf spring. Normally, said bolts will occupy a vertical position, but they will not be pulled out of perpendicular by any back-and-forth motion of the leaf spring 12, for any such motion will be instantly communicated to both the upper and the lower ends of each of said vertical bolts 8 and 9.

A plate 28 cross-connects cross-bolt 3 and vertical bolt 8. Said plate is bent into two parts which lie in planes approximately at right-angles to each other. In one of said parts is a perforation 29 through which bolt 3 is inserted, said perforation being of a diameter just sufficient to accommodate said bolt, and, in the other part of said plate is a rectangular slot 30, through which passes the vertical bolt 8. Said slot is of the exact width necessary to allow the bolt 8 to pass therethrough, but the length of said slot is greater than its breadth. Said plate 28, therefore, can move back and forth across bolt 8 in the direction of the length of slot 30, but is immovable with relation to bolt 8 in the direction of the breadth thereof. As bolt 3 passes through the perforation 29 in plate 28, tightening of nut 7 causes plate 28 to be held in rigid connection with bolt 3. The plate is set with the lengthwise tion of slot 30 at right angles to the axis of said bolt 3, and the shorter direction parallel to said axis, so that said bolt 3 can have no longitudinal motion toward or away from bolt 8, though it is permitted to move laterally with relation thereto. In the positions shown in the drawings, bolt 3 cannot move either toward the right or the left, Figs. 1 and 7, unless bolt 8 moves simultaneously therewith, while it can move toward the right or left, Fig. 3, independently of bolt 8, until said bolt strikes the ends of slot 30, after which the two bolts will move in unison.

In lieu of having a plate 28 to cross-connect bolts 3 and 8, bolt 3 may be constructed in the manner depicted in Fig. 2, where the head 32 of said bolt is shown as having a perforation 31 therein, through which perforation bolt 8 is inserted. When bolt 3 is so constructed, it is allowed practically no play, either longitudinally or laterally, with reference to bolt 8, though it can move vertically, in accordance with the compression or expansion of spring 5.

Still another modification is shown in Figs. 8 and 9, where the perforated head 32 is swiveled upon the shank of bolt 3, either by having a pin 33 pass through perforations provided therefor in the head 32 and shank of bolt 3, or the head 32 may have an annular flange 33 which engages the shoulder 4 of bolt 3. The effect secured, however, is practically the same, whether bolt 3 is connected to bolt 8 by means of plate 28, or by the constructions shown in Figs. 2, 8, or 9.

When it is desired to use only a single helical spring instead of a pair of such springs, the upturned end of the single spring 5 may be secured directly to the bracket 2, and the vertical bolt 8 to the leaf-spring 12. Fig. 10 of the drawings illustrates one example of connections which may be employed, and in said figure bolt 3 is shown as passing through the eye on the end of bracket 2 and the eye on the upper end of spring 5, thereby binding said parts together. Bolt 11 may similarly connect leaf spring 12 to bolt 8, or the upper end of said bolt 8 may be bifurcated and have two arms 34 through eyes 10 in which bolt 11 passes, spring 12 encircling said bolt as in the other forms of the invention. When a single spring is used, the brace 19, instead of terminating in a plate having two perforations therethrough, as in Fig. 6, has a single eye 35 which encircles bolt 8, said brace being held in place by nut 14.

The supplementary springs described in said Furmidge patent, No. 807,612, have been found highly valuable in actual use in the forms illustrated and described in said patent, but the purpose of the present invention is still to improve them. As great weights are imposed upon these supplementary springs, and as they are subjected to terrific strain when in use, particularly when the vehicle to which they are attached is turning a corner, there is a tendency on the part of the leaf spring 12 to pull them out of shape and unduly to strain same, owing to their fixed, though pivoted, relation to the bracket or hanger 2 by means of bolt 3, and their capacity for movement when pulled or pushed by the strain of leaf spring 12 on bolt 11. In this way, springs unprovided with a steadying device have a tendency to "turn over", and have been known to do so in practical use. By this is meant that, when a great weight is put upon the leaf spring 12, it exerts a strain upon bolt 11 which pulls bolts 8 and 9 unduly forward at their upper ends and presses them unduly backward at their lower ends, thus distorting helical springs 5 and 6 from their proper shape and from that shape in which they yield the greatest resilience. Moreover, side-motion when turning corners results, which strains the entire device laterally. All these objections are obviated by the herein-described invention. It is obvious, however, that when the herein-described device is used, bolts 8 and 9 cannot be thus pulled either unduly forward at one end or pressed unduly backward at the other, for, inasmuch as both ends of each of said bolts 8 and 9 are connected to said leaf spring, the upper ends by bolt 11 and the lower ends by brace 19, both ends of each of said bolts must move in unison, and in the same direction, in accordance with the movements of said spring. If, therefore, the spring 12 be given a forward jolt, instead of pulling the bolts 8 and 9 out of perpendicular, as would be the case were no steadying device provided, said bolts are so connected to said leaf spring that any pull upon said spring is communicated to both ends of each of the vertical bolts 8 and 9, both ends of each of said bolts being given motion to the same extent and in the same direction as said leaf spring 12 is moved.

In cases where side-motion results from the pitching of the vehicle as it rounds a corner, the tendency of such motion is to pull the top ends of bolts 8 and 9 toward one side, and to force the bottom ends of said bolts in a direction opposite to that in which the top ends are moved. When the vehicle turns a corner, the leaf spring 12, being connected to the axle, is given a side-pull before the vehicle body is affected, and thus the top ends of bolts 8 and 9 are jerked to one side by the leaf spring 12 before the top ends of the helical springs, which are connected to the vehicle body by the hanger 2, are moved thereby. This tends to twist, wrench, and distort the helical springs. If, however, the herein-described steadying device is used, the vertical bolts and the helical springs encircling same are forced to move laterally in unison, for the plate 28, or its equivalent, in case the bolt 3 be constructed as in Figs. 2 or 8, instantly communicates any side pull of bolts 8 and 9 to bolt 3, and, consequently, to the helical springs 5 and 6 which are secured to said bolt 3. Bolts 8 and 9 are thus kept, at all times, in a predetermined relation to bolt 3, and at a fixed distance from each of the winds of the helical springs, and any tendency to distort said springs by moving said vertical bolts from side to side within said springs is thereby obviated, since said bolts can have no such motion.

By the use of both parts of the herein-described steadying device, therefore, it is rendered impossible for the bolts 8 and 9 to be forced from one side to the other within the springs by any side-swaying of the vehicles, since springs and bolts must move in unison, and, moreover, any undue forward or backward motion of the leaf spring produces the same motion at both ends of each of the vertical bolts, but cannot jerk one end without similarly affecting the other. The result is that, as the vertical bolts cannot be bent back and forth, or from side to side, within the supplementary springs, said springs do not become twisted or distorted, and their life is prolonged and utility greatly increased.

Having thus described my said invention, what I claim and desire to secure by Letters-Patent is:

1. In a device of the character described, the combination of an auxiliary spring, means for attaching same to the vehicle, means for connecting same to the main spring, said means being in connection with one end of said auxiliary spring, and means secured to said second-mentioned means adjacent the point of connection thereof with said auxiliary spring, said means extending to the body of the main spring.

2. In a device of the character described, the combination of an auxiliary spring, means for attaching one end of same to the vehicle, means for connecting the other end of same to the end of the main spring, and means for connecting said last-mentioned end of said auxiliary spring to another part of said main spring.

3. In a device of the character described, the combination of an auxiliary spring, means for attaching same to the vehicle, a hanger for connecting same to the main spring, said hanger being in pivotal connection with one end of said main spring, and a connector extending from the body of the main-spring to a point of said hanger opposite its point of connection with the main spring.

4. In a device of the character described, the combination of an auxiliary spring, means for attaching same to the vehicle body, means for connecting same to the main spring, and means engaging said auxiliary spring at a point adjacent that end of said spring which is connected to the vehicle, said last-mentioned means connecting said end to said second-mentioned means.

5. In a device of the character described, the combination of an auxiliary spring, means for attaching same to the vehicle, means for connecting same to the main spring, and means cross-connecting said vehicle-connecting means and said main spring-connecting means.

6. In a device of the character described, the combination of an auxiliary spring, means for attaching same to the vehicle, means for connecting same to the main spring, and means cross-connecting said vehicle-connecting means and said main spring-connecting means and holding said first-mentioned means in predetermined relation to said second-mentioned means.

7. In a device of the character described, the combination of an auxiliary spring, means for attaching same to the vehicle, means for connecting same to the main spring, and a member encircling both of said aforementioned means and keeping same in predetermined relation to each other.

8. In a device of the character described, the combination of an auxiliary spring, a bolt connected thereto from which a connection extends to the vehicle, a hanger connecting said auxiliary spring to the main spring, and a member secured to said bolt and engaging said hanger whereby said auxiliary spring is kept in predetermined relation to said hanger.

9. In a device of the character described, the combination of an auxiliary spring, means for attaching same to the vehicle body, means connected at one end to said auxiliary spring and connected at the end opposite said first-mentioned end to the main spring, means extending from a point adjacent said first-mentioned end to the main spring, and means secured to said first-mentioned means and engaging said second-mentioned means adjacent the second-mentioned end thereof.

10. In a device of the character described, the combination of a pair of auxiliary springs, means for connecting same to the vehicle body, means for connecting same to the main spring, and means intermediate said first-mentioned and said second-mentioned means, and holding same in predetermined relation to each other.

11. In a device of the character described, the combination of a pair of auxiliary springs, means for attaching same to the vehicle, means for connecting same to the main spring, and means for holding said last-mentioned means in predetermined relation to said main spring.

12. In a device of the character described, the combination of a pair of auxiliary springs, means for attaching same to the vehicle, means for connecting same to the main spring, said means being, at opposite ends, held in predetermined relation to said main spring and to said first-mentioned means.

13. In a device of the character described, the combination of a pair of auxiliary springs, means for connecting same to the vehicle, hangers connecting each auxiliary spring to the main spring, means connecting the ends of both of said hangers to the main spring, and means cross-connecting said vehicle-connecting means to one of said hangers.

14. In a device of the character described, the combination of a main spring a pair of auxiliary springs, a bolt to which the same are secured, a hanger connecting each of said auxiliary springs to said main spring, and a member intermediate said bolt and one of said hangers.

15. In a device of the character described, the combination of a pair of auxiliary springs, bolts secured at one end to same, a main spring in connection with the ends opposite said first-mentioned ends, a cross-tie connecting said bolts, and a brace extending from said cross-tie to said main spring.

16. In a device of the character described, the combination of a pair of auxiliary springs, a bolt to which the same are secured, a hanger connecting each of said auxiliary springs to the main spring, and a plate having perforations therein, said bolt and one of said hangers passing through said perforations.

17. In a device of the character described, the combination of a pair of helical springs, bolts secured to and supporting one end of each, a main spring in connection with the ends of said bolts opposite the ends thereof secured to said helical springs, and a member connecting said bolts and said main spring, said member being bifurcated at the end thereof which is secured to the main spring, and being perforated at the opposite end, said bolts passing through said perforations.

18. In a device of the character described, the combination of an auxiliary spring, means for attaching one end of same to the vehicle, means for connecting the other end of same to the end of the main spring, and means for connecting said second-mentioned end and said second-mentioned means to another part of said main spring.

19. In a device of the character described, the combination of an auxiliary spring, means for attaching same to the vehicle, a hanger for connecting same to the main spring, said hanger being in pivotal relation with one end of said main spring and in fixed relation with another part thereof.

20. In a device of the character described, the combination of an auxiliary spring, means for attaching same to the vehicle body, a hanger for connecting same to the main spring, and means engaging said hanger and keeping same at a fixed angle to said main spring.

21. In a device of the character described, the combination of a pair of auxiliary springs, means for attaching same to the vehicle, hangers for connecting same to the main spring and a connector for holding said hangers in predetermined relation to said main spring.

22. A spring attachment for vehicles, consisting of a hanger pending from the main spring, a minor spring carried by the pendent hanger, and a rest held by the minor spring for the body hanger of the vehicle, there being a connector for the body of the pendent hanger and the body portion of the main spring.

In testimony whereof I have affixed my signature in presence of two witnesses.

WILLIAM YOUNG.

Witnesses:
HUGH K. WAGNER,
GLADYS WALTON.